United States Patent
Yang et al.

(10) Patent No.: US 9,632,531 B2
(45) Date of Patent: Apr. 25, 2017

(54) ELECTRONIC DEVICE AND METHOD FOR MAKING THE SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Jian-Jun Yang, Shenzhen (CN); Yan-Min Wang, Shenzhen (CN); Lei Wang, Shenzhen (CN); Ning Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 3 days.

(21) Appl. No.: 14/689,834

(22) Filed: Apr. 17, 2015

(65) Prior Publication Data
US 2016/0187925 A1  Jun. 30, 2016

(30) Foreign Application Priority Data

Dec. 31, 2014  (CN) .......................... 2014 1 0847172

(51) Int. Cl.
G06F 1/16 (2006.01)
B29C 45/14 (2006.01)
B29L 31/34 (2006.01)

(52) U.S. Cl.
CPC .......... *G06F 1/1626* (2013.01); *G06F 1/1601* (2013.01); *B29C 45/14* (2013.01); *B29L 2031/3481* (2013.01)

(58) Field of Classification Search
CPC ................. G06F 1/1626; G06F 1/1628; G06F 2200/1633; G06F 1/1656; G06F 1/1684; G06F 1/1613; G06F 1/1633; G06F 1/1652; G06F 1/181; G06F 1/203; G06F 3/0488; G06F 1/1601; G06F 1/1637; G06F 1/16; G06F 1/1658; G06F 1/183; H05K 5/0017; H05K 5/0004; H05K 5/0217; H05K 5/03; H05K 5/04; H05K 5/0013; H05K 5/02; B29C 45/24; B29C 45/14; B29L 2031/3481
USPC .................. 361/679.55–679.58, 679.3, 752; 349/58–60; 455/575.1–575.4; 379/433.11–433.13
See application file for complete search history.

(56) References Cited

U.S. PATENT DOCUMENTS

| 7,006,168 | B2* | 2/2006 | Lee ................... G02F 1/133308 349/58 |
| 2011/0188179 | A1* | 8/2011 | Myers ................... G06F 1/1626 361/679.01 |
| 2014/0139978 | A1* | 5/2014 | Kwong ............... H04M 1/0202 361/679.01 |

* cited by examiner

*Primary Examiner* — Anthony Haughton
*Assistant Examiner* — Ingrid Wright
(74) *Attorney, Agent, or Firm* — Steven Reiss

(57) ABSTRACT

An electronic device includes a housing and a back member. The housing includes a frame defining a number of recesses. The back member is connected to the frame. The back member includes a first portion connected to the frame and at least one second portion combined between the first portion and the frame. The at least one second portion includes a number of projections embedded into the recesses.

15 Claims, 6 Drawing Sheets

ELECTRONIC DEVICE AND METHOD FOR MAKING THE SAME

FIELD

The subject matter herein generally relates to electronic devices and a method for manufacturing the electronic devices, particularly an electronic device having a back member made of different materials (e.g. a metallic portion and a plastic portion) and a method for making the electronic device.

BACKGROUND

Electronic devices commonly include a metallic housing and other members such as a plate received in the housing and integrated with the housing. The other members can be assembled to the housing by fasteners (e.g. screws). However, the assembly between the housing and the other members mentioned-above is complex and can be unreliable.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
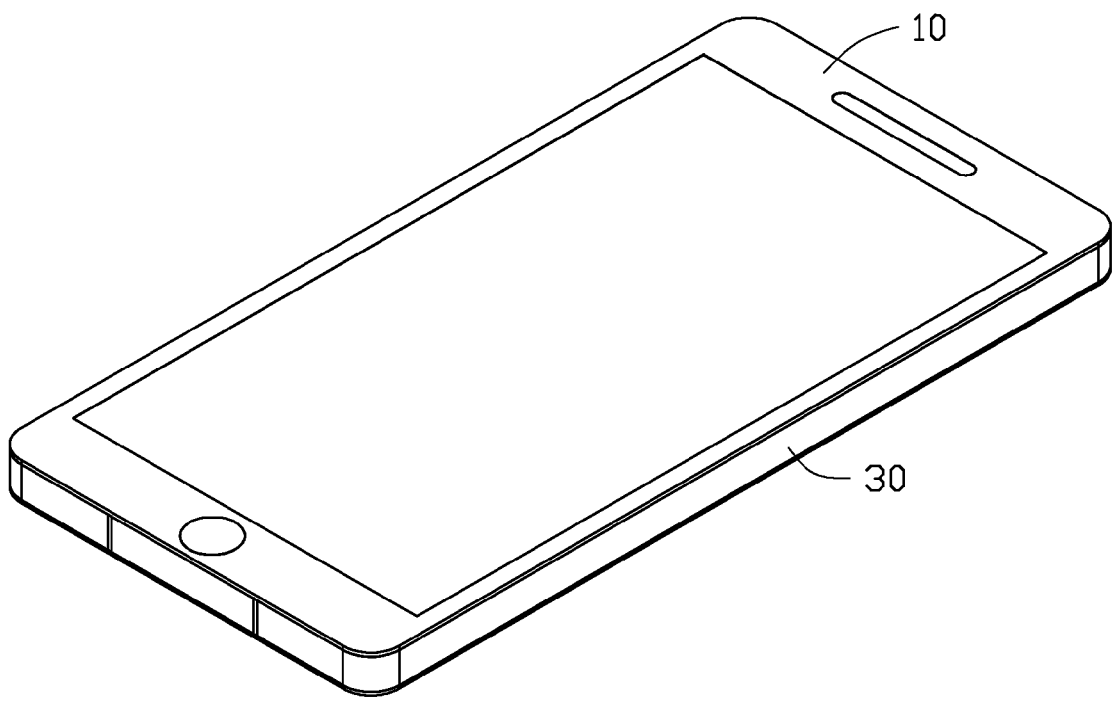
FIG. 1 is an isometric view of an electronic device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 is an isometric view of an electronic device 100, according to an exemplary embodiment. The electronic device 100 can be, but not limited to, a mobile phone, a personal digital assistant (PDA), and a tablet personal computer. In this exemplary embodiment, the electronic device 100 is a mobile phone.

Figure 2:
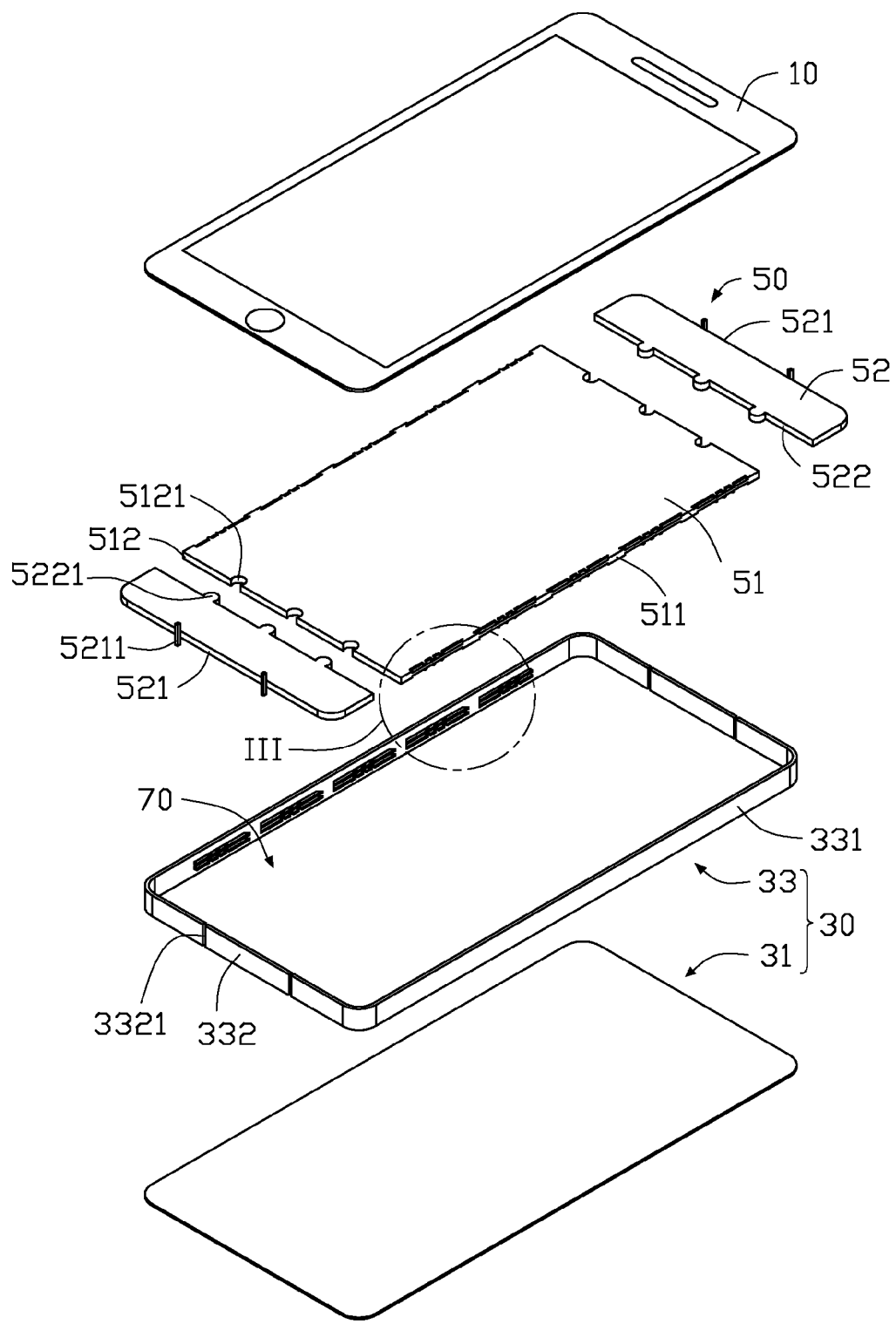
FIG. 2 is an exploded, isometric view of the electronic device of FIG. 1.

FIG. 2 illustrates that the electronic device 100 includes a window portion 10, a housing 30, and a back member 50. The window portion 10 is assembled to the housing 30 and forms a receiving chamber 70 with the housing 30. The receiving chamber 70 is configured for receiving the back member 50 and electronic elements such as a battery and an antenna.

The housing 30 includes a cover 31 and a frame 33. The cover 31 covers one side of the frame 33. The cover 31 can be made of metal, glass, or plastic material.

The frame 33 is substantially rectangular and includes two opposite sidewalls 331 and two opposite end walls 332 perpendicular to the sidewalls 331 and interconnecting the sidewalls 331.

Figure 3:
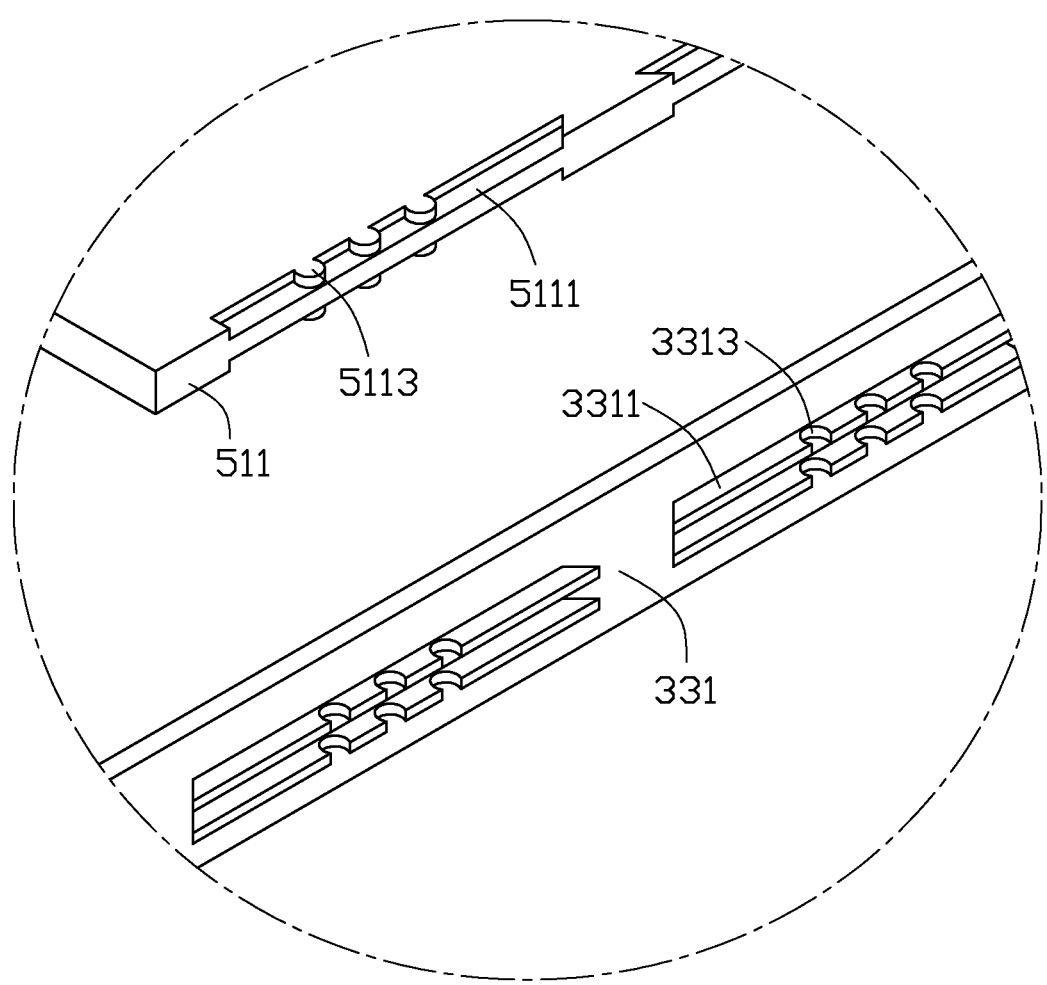
FIG. 3 is an enlarged view of the electronic device of circled portion III in FIG. 2.

FIG. 3 illustrates that a plurality of connecting members 3311 are positioned on each sidewall 331 facing the receiving chamber 70. In this exemplary embodiment, the connecting members 3311 are arranged in two rows and each connecting member 3311 is substantially trapezoidal. A length of an edge of each connecting member 3311 connected to the sidewall 331 is shorter than that of an opposite free edge of each connecting member 3311. At least one receiving slot 3313 is defined in each connecting member 3311. In this exemplary embodiment, there are three receiving slots 3313 defined in each connecting member 3311.

A plurality of gaps 3321 (shown in FIG. 4) are longitudinally defined in each end wall 332. The gaps 3321 are corresponding to an antenna received in the receiving chamber 70. In this exemplary embodiment, there are two gaps 3321 which divide the end walls 332 into a plurality of separating portions so that a middle portion of each end wall 332 is separated and insulated from the sidewalls 331. Thus, the antenna received in the gaps 3321 can be separated from the sidewalls 331 and interference from the housing 30 is prevented. In this exemplary embodiment, a width of each gap 3321 is about 1 mm-3 mm. The frame 33 can be made of aluminum or aluminum alloy materials.

Figure 4:
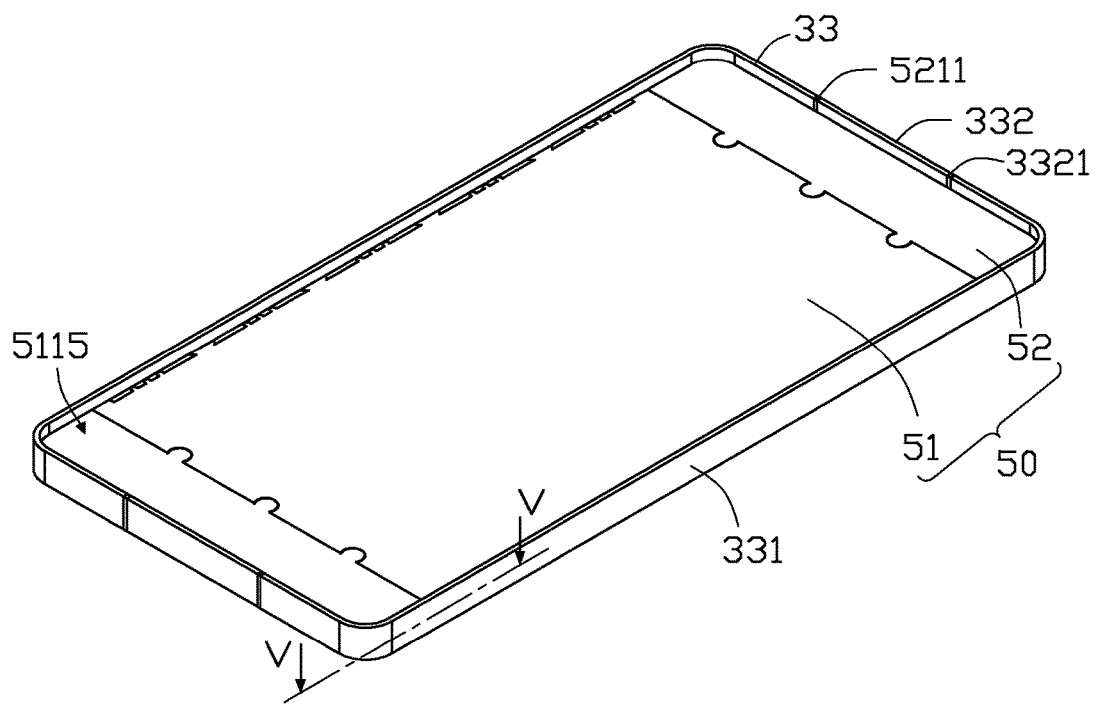
FIG. 4 is an isometric view of a frame of the electronic device of FIG. 2.
Figure 5:
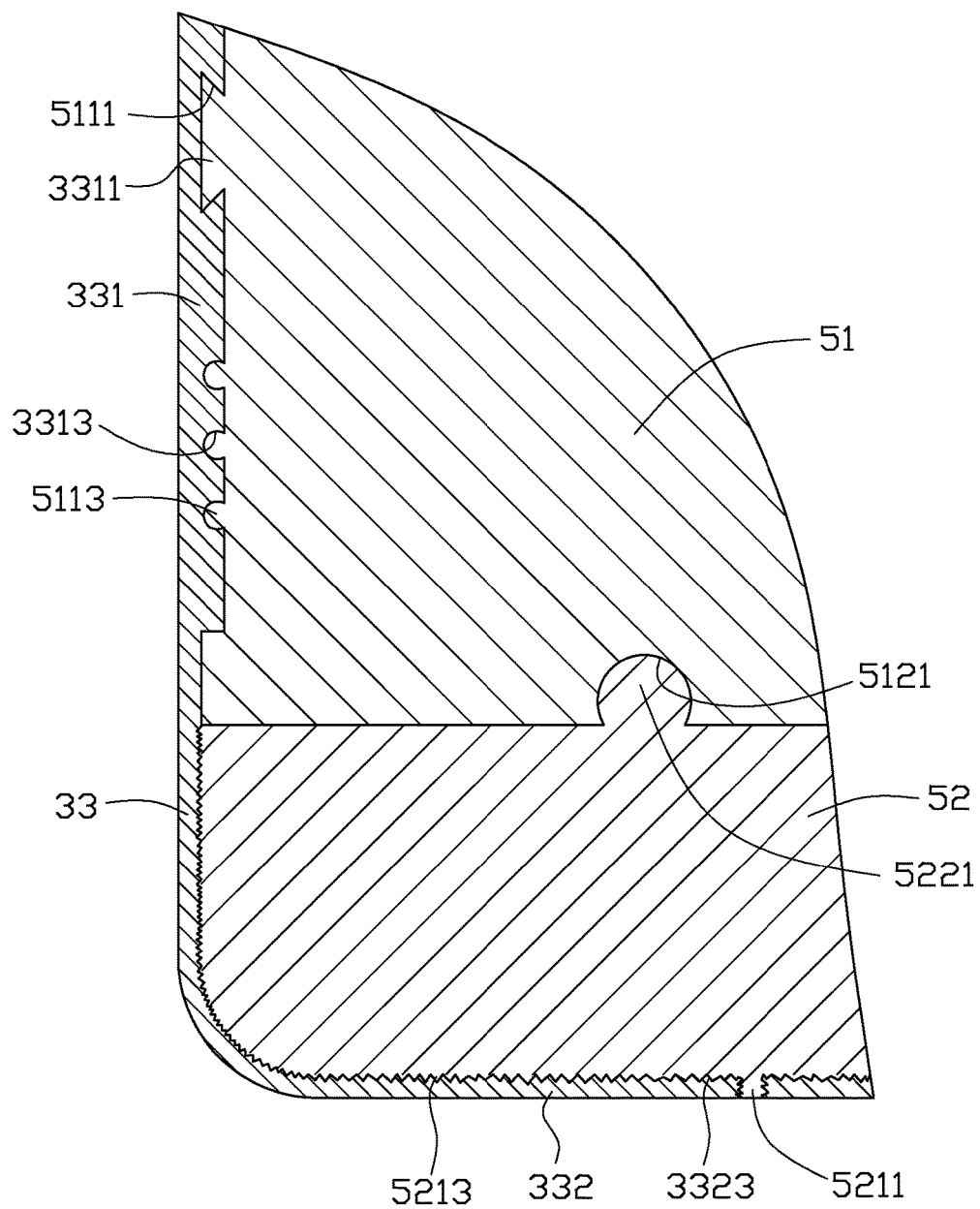
FIG. 5 is a cross-sectional view of the electronic device of FIG. 4 along line V-V.

FIGS. 4 and 5 illustrate that a plurality of recesses 3323 are defined in a portion of an inner surface of each sidewall 331, an inner surface of each end wall 332, and two opposite sides of each gap 3321. An aperture of each recess 3323 is about 30 nm-120 nm. The recesses 3323 are configured for connecting the frame 33 and the back member 50.

The back member 50 includes a first portion 51 and at least one second portion 52 connected to the first portion 51. In this exemplary embodiment, the first portion 51 is metallic, and the at least one second portion 52 is plastic.

The first portion 51 includes two opposite side surfaces 511 and two opposite end surfaces 512 perpendicular to the side surfaces 511 and interconnecting the side surfaces 511. A plurality of latching slots 5111 are defined in the side surfaces 511 corresponding to the connecting members 3311 and configured for latching to the connecting members 3311. At least one protruding block 5113 protrudes from the side surface 511 at each latching slot 5111 and corresponds to the receiving slots 3313. Each protruding block 5113 is latched into one of the corresponding receiving slots 3313 so that the first portion 51 is fixedly connected to the frame 33 with at least one receiving space 5115 formed between the first portion 51 and the frame 33. In this exemplary embodiment, there are two receiving spaces 5115 formed at two ends of the first portion 51 and configured for receiving the second portions 52. A plurality of latching holes 5121 are defined in each end surface 512 and configured for latching to the second portions 52. In this exemplary embodiment, each latching hole 5121 is substantially half-circular. The first portion 51 can be made of magnesium and aluminum alloy.

The second portions 52 are fixedly received in the receiving spaces 5115. Each second portion 52 includes a first surface 521 and a second surface 522. In this exemplary embodiment, the first surface 521 is defined as a surface of the second portion 53 connected to the frame 33 and the second surface 522 is defined as a surface of the second portion 53 connected to the first portion 51. The first surface 521 is a curved surface connected to two ends of the second surface 522. A plurality of ribs 5211 protrude from the first surface 521 corresponding to the gaps 3321. The ribs 5211 are embedded into and filled in the corresponding gaps 3321 to keep an integrity of the appearance of the frame 33. A plurality of protrusions 5213 protrude from the first surface 521 and an outer surface of each rib 5211 corresponding to the recesses 3323. Each protrusion 5213 engages with one of the corresponding recesses 3323 so that each second portion 52 is stably and fixedly connected to the frame 33. At least one projection 5221 protrudes from the second surface 522 corresponding to the latching holes 5121. The projections 5221 engages with the latching holes 5121 so that each second portion 52 is stably and fixedly connected to the first portion 51. Each second portion 52 is formed by injection molding.

To assemble the housing 30 to the window portion 10, a portion of the frame 33 sandwiching the ribs 5211 is corresponding to the antenna of the electronic device so that signals of the antenna can be transmitted through the ribs 5211. In this exemplary embodiment, one of the sidewalls 331 and the end walls 331 can be coupled to the antenna so that the frame 33 can serve as an extra portion of the antenna. In other embodiments, the frame is not coupled to the antenna, and the signals of the antenna can be still transmitted through the ribs 5211.

Figure 6:
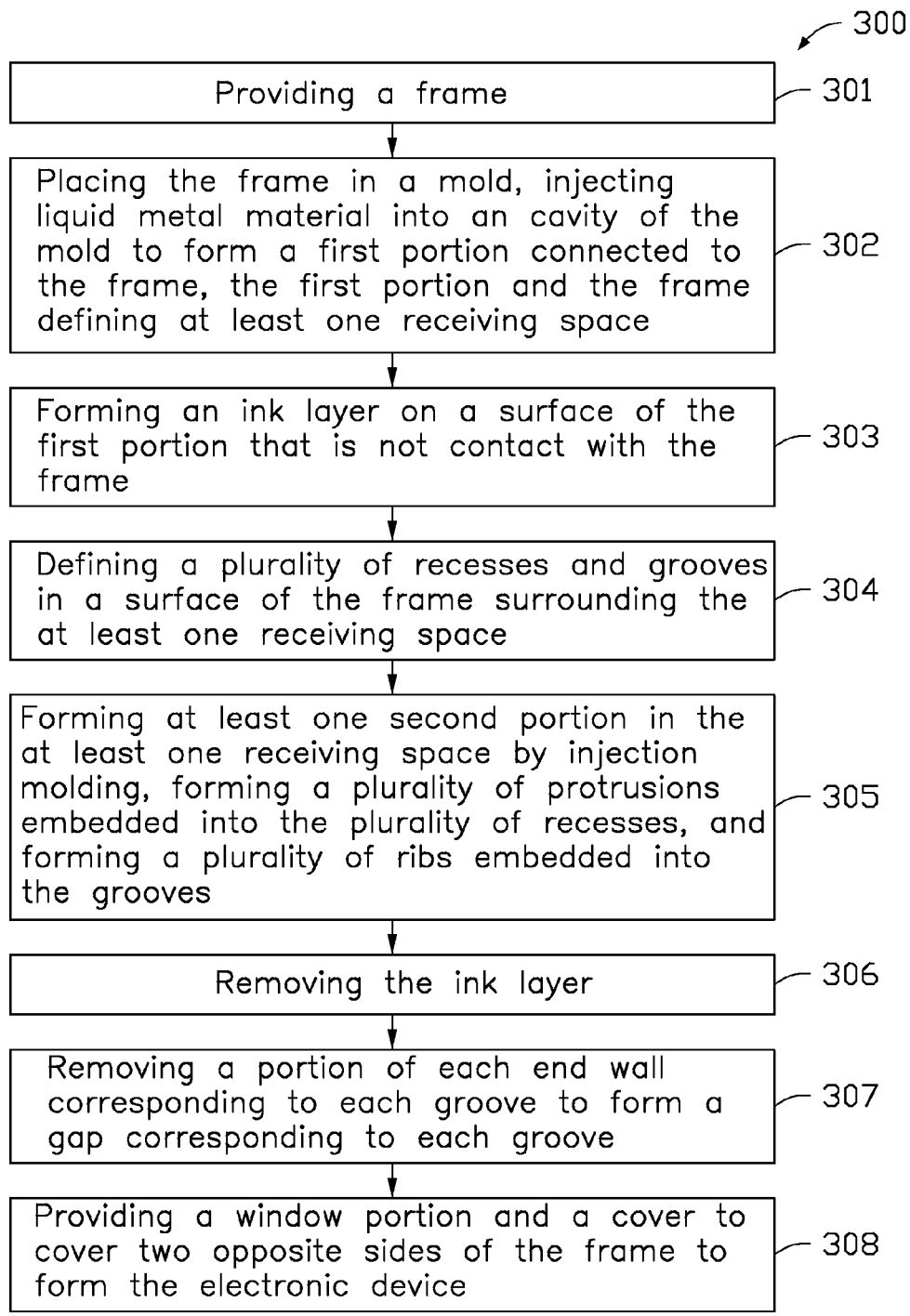
FIG. 6 is a flowchart of one embodiment of a method for manufacturing the electronic device of FIG. 1.

Referring to FIG. 6, a flowchart is presented in accordance with an example embodiment which is being thus illustrated. The example method 300 is provided by way of example, as there are a variety of ways to carry out the method. Each block shown in FIG. 6 represents one or more processes, methods or subroutines, carried out in the exemplary method 300. Additionally, the illustrated order of blocks is by example only and the order of the blocks can change according to the present disclosure. The exemplary method 300 can begin at block 301.

At block 301, a frame 33 formed by computer numerical control (CNC) technology is provided. In this exemplary embodiment, the frame 33 includes two opposite sidewalls 331 and two opposite end walls 332 perpendicular to the sidewalls 331 and interconnecting the end walls 332. A plurality of connecting members 3311 are formed on an inner surface of each sidewall 331. At least one receiving slot 3313 is defined in each connecting member 3311. In this exemplary embodiment, the connecting members 3311 are arranged in two rows and there are three receiving slots 3313 defined in each connecting member 3311. Two grooves are longitudinally defined in each end wall 332.

At block 302, a first portion 51 is formed in the frame 33. In this exemplary embodiment, the first portion 51 is metal. The frame 33 is placed in a casting mold (not shown). Liquid metal material is injected into a cavity of the casting mold to form the first portion 51 connected to the frame 33. The metal material can be magnesium and aluminum alloy. In this exemplary embodiment, the first portion 51 includes two opposite side surfaces 511 and two opposite end surfaces 512 perpendicular to the side surfaces 511 and interconnecting the side surfaces 511. In a coasting process of forming the first portion 51, a plurality of latching slots 5111 are formed in the side surfaces 511. At least one protruding block 5113 is formed in each latching slot 5111. A plurality of latching holes 5121 are formed in each end surface 512. The connecting members 3311 are latched into the latching slots 5111. The protruding blocks 5113 engage with the receiving slots 3313. Thus, the first portion 51 is integrated with the frame 33 with at least one receiving space 5115 formed between the first portion 51 and the frame 33. In this exemplary embodiment, there are two receiving spaces 5115 communicating with the grooves.

At block 303, an ink layer (not shown) is formed on a surface of the first portion 51. In this exemplary embodiment, ink is sprayed on the surface of the first portion 51 that is contacted with the frame 33 and solidified to form the ink layer. The ink layer is configured for protecting the first portion 51 in subsequent manufacturing processes.

At block 304, a plurality of recesses 3323 are formed on a surface of each receiving space 5115 and a surface of each gap 3321. In this exemplary embodiment, a surface of an assembly that is formed by the first portion 51 and the frame 33 is processed by dipping solution, electrochemistry etching, chemical etching, and anodizing so that the recesses 3323 are formed on two ends of each sidewall 331, an inner surface of each end 332, and two opposite surfaces of each groove 3321. An aperture of each recess 3323 is about 30 nm-120 nm.

At block 305, at least one second portion 52 is formed by injection molding. In this exemplary embodiment, the first portion 51 and the frame 33 are placed in a mold (not shown). Liquid plastic material is injected in to the receiving spaces 5115 and solidified to form two second portions 52 at two ends of the first portion 51. In this exemplary embodiment, a plurality of protrusions 5213 are formed by a first portion of the plastic material embedded into the recesses 3323 during the process of injecting the plastic material so that the second portions 52 and the frame 33 can be stably integrated together. A second portion of the plastic material is embedded into the grooves and solidified to form a plurality of ribs 5211 so that the second portions 52 and the frame 33 can be stably integrated together. A third portion of the plastic material is embedded into the latching holes 5121 and solidified to form a plurality of projections 5221 so that the second portions 52 and the first portion 51 can be stably integrated together.

At block 306, the ink layer is removed from the surface of the first portion 51.

At block 307, a portion of each end wall 332 corresponding to each groove is removed so that a gap 3321 is formed corresponding to each groove. Thus, a middle portion of each end wall 332 is separated from the sidewalls 331

At block 308, a window portion 10 and a cover 31 are provided to cover two opposite sides of the frame 33 to form the electronic device 100.

The protrusions 5213, the ribs 5211, and the projections 5221 are formed by the liquid material filling in the recesses 3323, the gaps 3321, and the latching holes 5121. Therefore, the first portion 51, the second portions 52, and the frame 33 are simply and reliably integrated together.

It is to be understood, however, that even through numerous characteristics and advantages of the present disclosure have been set forth in the foregoing description, together with details of assembly and function, the disclosure is illustrative only, and changes may be made in the details, especially in the matters of shape, size, and arrangement of parts within the principles of the disclosure to the full extent indicated by the broad general meaning of the terms in which the appended claims are expressed.

What is claimed is:

1. An electronic device comprising:
   a housing comprising a frame, the frame defining a plurality of recesses;
   a back member connected to the frame, the back member comprising:
      a first portion connected to the frame; and
      at least one second portion combined between the first portion and the frame, the at least one second portion comprising a plurality of projections embedded into the recesses;
   wherein the frame comprises two opposite sidewalls and two opposite end walls perpendicular to the sidewalls and interconnecting the sidewalls, each end wall defines a plurality of gaps, the least one second portion comprises a plurality of ribs corresponding to the gaps, the plurality of ribs are embedded into the plurality of gaps.

2. The electronic device of claim 1, wherein a width of each gap is about 1 mm-3 mm.

3. The electronic device of claim 1, wherein each sidewall comprises a plurality of connecting members, the first portion comprises two opposite side surfaces, each side surface defines a plurality of latching slots corresponding to the plurality of connecting members, each connecting member is latched into one of corresponding latching slots.

4. The electronic device of claim 3, wherein each connecting member defines a plurality of receiving slots, each side surface further comprises a plurality of protruding blocks protruding from the side surface at each latching slot and corresponding to the plurality of receiving slots, each protruding block is latched into one of the corresponding receiving slots.

5. The electronic device of claim 3, wherein the first portion further comprises two opposite end surfaces, each end surfaces defines a plurality of latching holes, the least one second portion comprises a plurality of projection protruding from an surface facing the first portion, the projections engages with the latching holes.

6. The electronic device of claim 1, wherein an aperture of each recess is about 30 nm-120 nm.

7. The electronic device of claim 1, further comprising a window portion assembled to the housing to form a receiving chamber with the housing.

8. A method for making an housing for electronic device comprising:
   providing a frame;
   placing the frame in a mold, injecting liquid metal material into an cavity of the mold to form a first portion connected to the frame, the first portion and the frame defining at least one receiving space;
   forming an ink layer on a surface of the first portion that is not contact with the frame;
   defining a plurality of recesses in a surface of the frame surrounding the at least one receiving space;
   forming at least one second portion in the at least one receiving space by injection molding, and forming a plurality of protrusions embedded into the plurality of recesses;
   removing the ink layer; and
   providing a window portion and a cover to cover two opposite sides of the frame to form the housing for electronic device.

9. The method of claim 8, further comprising:
   defining a plurality of grooves in the frame; and
   forming a plurality of ribs by a first portion of liquid plastic material embedded into the grooves; and
   removing a portion of each end wall corresponding to each groove to form a gap corresponding to each groove.

10. A housing for an electronic device comprising:
    a frame having:
    a first end wall with a top portion and an opposite bottom portion;
    a second end wall with a top portion and an opposite bottom portion, the second end wall being opposite to, and substantially parallel with, the first end wall;
    a first side wall with a top portion and an opposite bottom portion, the first side wall being substantially perpendicular to the first end wall and the second end wall; and
    a second side wall with a top portion and an opposite bottom portion, the second side wall being opposite to, and substantially parallel with, the first side wall, and substantially perpendicular to the first end wall and the second end wall;
    wherein, the first frame end wall has an inner surface facing the second end wall and the second frame end wall has an inner surface facing the first frame end wall;
    wherein, the first frame side wall has an inner surface facing the second frame side wall and the second frame side wall has an inner surface facing the first frame side wall;
    a cover covering one side of the frame;
    a back member attachable to the bottom portions of the frame walls, the back member having a first portion and a second portion;
    wherein, the back member first portion is attachable to the bottom portion of the frame first side wall and the bottom portion of the frame second side wall;
    wherein, a plurality of recesses are defined in at least a portion of one or more of the bottom portion of the first frame side wall, the second frame side wall and the second frame end wall;
    wherein, a portion of one or more edges of the second back member portion includes a plurality of projections engagable with the plurality recesses; and
    wherein each of the first end wall and the second end wall defines a plurality of gaps, the least one second portion comprises a plurality of ribs corresponding to the gaps, the plurality of ribs are embedded into the plurality of gaps.

11. The housing for an electronic device of claim 10, wherein a width of each gap is about 1 mm-3 mm.

12. The housing for an electronic device of claim 10, wherein each of the first side wall and the second side wall comprises a plurality of connecting members, the back member first portion comprises two opposite side surfaces, each side surface defines a plurality of latching slots corresponding to the plurality of connecting members, each connecting member is latched into one of corresponding latching slots.

13. The housing for an electronic device of claim 12, wherein each connecting member defines a plurality of receiving slots, each side surface further comprises a plurality of protruding blocks protruding from the side surface at each latching slot and corresponding to the plurality of receiving slots, each protruding block is latched into one of the corresponding receiving slots.

14. The housing for an electronic device of claim 12, wherein the back member first portion further comprises two opposite end surfaces, each end surfaces defines a plurality of latching holes, the least one second portion comprises a plurality of projection protruding from an surface facing the first portion, the projections engages with the latching holes.

15. The housing for an electronic device of claim 10, wherein an aperture of each recess is about 30 nm-120 nm.

* * * * *